July 25, 1961 C. L. STEC 2,993,488
VALVE MECHANISM
Filed July 7, 1959 5 Sheets-Sheet 1

INVENTOR
CHARLES L. STEC

BY
ATTORNEYS

INVENTOR
CHARLES L. STEC.

BY

ATTORNEYS

July 25, 1961     C. L. STEC     2,993,488
VALVE MECHANISM

Filed July 7, 1959     5 Sheets-Sheet 3

INVENTOR
CHARLES L. STEC.

July 25, 1961  C. L. STEC  2,993,488
VALVE MECHANISM
Filed July 7, 1959  5 Sheets-Sheet 4

INVENTOR
CHARLES L. STEC
BY
ATTORNEYS

July 25, 1961  C. L. STEC  2,993,488
VALVE MECHANISM
Filed July 7, 1959  5 Sheets-Sheet 5
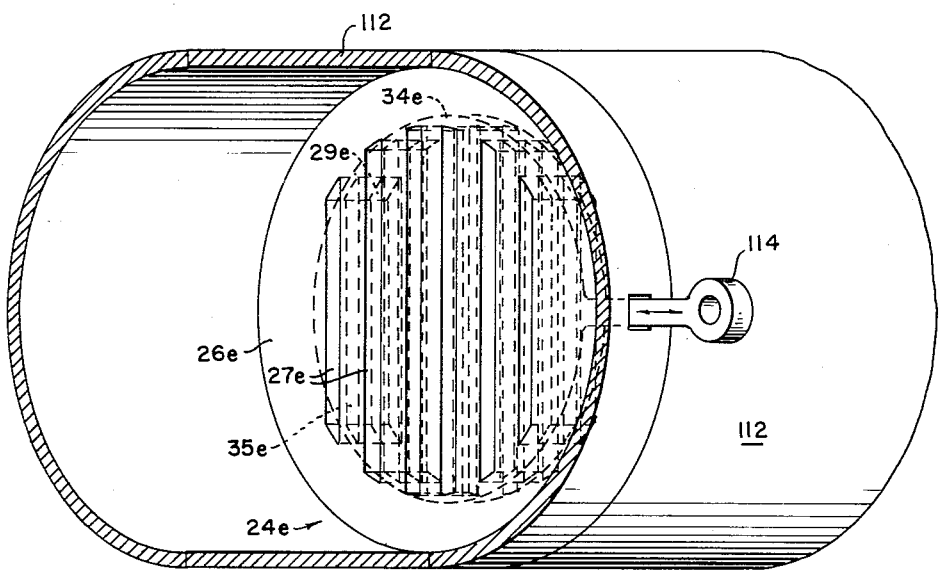
FIG. 11.
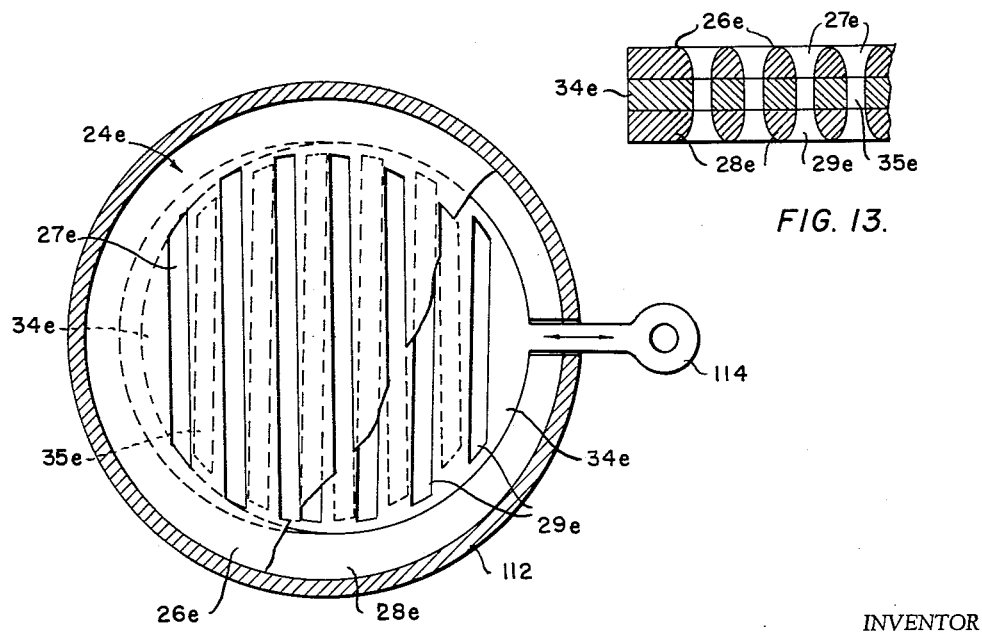
FIG. 12.
FIG. 13.
INVENTOR
CHARLES L. STEC.
BY
ATTORNEYS United States Patent Office 2,993,488
Patented July 25, 1961

2,993,488
VALVE MECHANISM
Charles L. Stec, 2725 N. Nelson St., Arlington, Va.
Filed July 7, 1959, Ser. No. 825,614
16 Claims. (Cl. 123—188)
(Granted under Title 35, U.S. Code (1952), sec. 266)

The invention described herein may be manufactured and used by or for the Government of the United States of America for governmental purposes without the payment of any royalties thereon or therefor.

This invention relates to a valve having a reciprocating or rotary valve closing element and actuating mechanisms used therewith.

In accordance with the instant invention, the valve can take the form of a pair of slotted members movable relative to each other to a slot-aligned position. All of the slots in any one member are substantially parallel to one another, but the slots in one of the members are non-parallel to the slots in the other member. By making the slot in the two members non-parallel, a continuous bearing surface is provided between the two members in every relative position of the two members. A further advantage of this construction lies in the fact that the edges of the two cooperating slots, one in each member, engage and disengage in a relatively gradual travelling manner from one end of the slots to the other, in the nature of a scissors-like action. A valve in accordance with this invention may have different configurations and dimensions of the slots and spacing between slots, depending on the application thereof. By controlling these physical relationships, the valve adapts itself to adjusting purposes, flow control purposes, and flow distribution purposes with various types of fluids. It is emphasized that the instant valve may be used in engines, pipelines, compressors, or for that matter wherever the control of fluid flow is necessary.

For purposes of illustration only, an embodiment of the instant valve is shown applied to a small internal combustion engine. In the particular embodiment, the valve is of relatively small size, but it is to be clearly understood that the size can be larger or smaller, depending upon the application to which valve is put. In small sizes, where mass and momentum are kept small, the valve may be operated at frequencies as high as thousands of times per second.

An object of the invention is to provide a valve in which the opening, thereof is controlled, with a small motion for a proportionately large effective opening.

It is another object of the invention to provide a valve in which the movable valve element or control member is positively driven, not requiring the use of springs or similar means.

Still another object of the invention is to provide a positive action control valve in which the movable member may be of small size and light mass, thus adapting the valve for high-speed operation.

Still an added object of the invention is to provide a valve of a type described in which the feathering action upon opening of the valve is decreased considerably for the size of the valve by the use of a plurality of slots. Such a construction in effect increases the area of valve opening at the beginnig of the opening of said valve at a greater rate per given interval of time than has heretofore been achieved.

A further object of the invention is to provide a valve of the type described which gives increased heat transfer between the elements of the valve to surrounding bodies because of the retention of contact at all times between the relatively movable members of the valve and the structure in which the valve is used.

Another object of this invention is to provide a valve having a shorter stroke than a conventional tappet valve for a given area of port opening.

A further object of this invention is to provide a valve that is self cleaning.

Still a further object of this invention is to provide a valve having more effective lubrication characteristics than a tappet valve because of the sliding action between the elements thereof.

Still another object of this invention is to provide a valve having a faster rate of opening, per given area of opening, than a conventional tappet valve.

Still a further object of this invention is to provide a valve having more port opening area, for a given amount of valve travel, than does a poppet valve of the same cross-sectional area.

Still an additional object of this invention is to provide a valve in which the valve opening area is dependent upon the cross-sectional area of the valve, rather than the stroke, or lift, of the valve.

A further object of this invention is to provide a valve having a self-lapping action between the movable parts thereof.

Another object of this invention is to provide a valve wherein the air passages therethrough are adapted to be aerodynamically designed so as to improve the flow characteristics through the valve.

Other objects and many of the attendant advantages of this invention will be readily appreciated as the same becomes better understood by reference to the following detailed description when considered in connection with the accompanying drawings, wherein.

Figure 3:
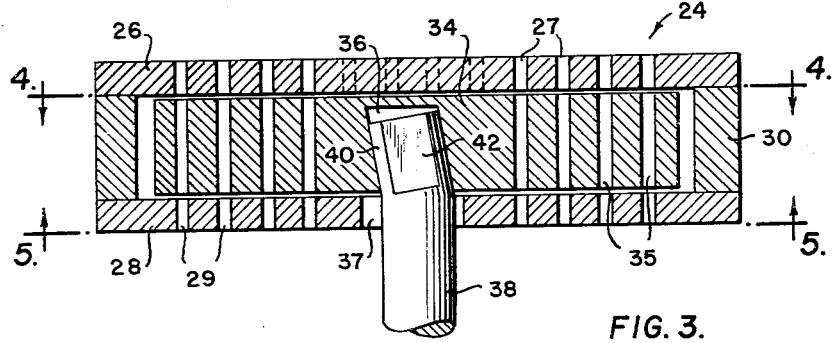
FIG. 3 is an enlarged sectional view, corresponding to a portion of FIG. 2 and showing the instant valve open position.
Figure 4A:
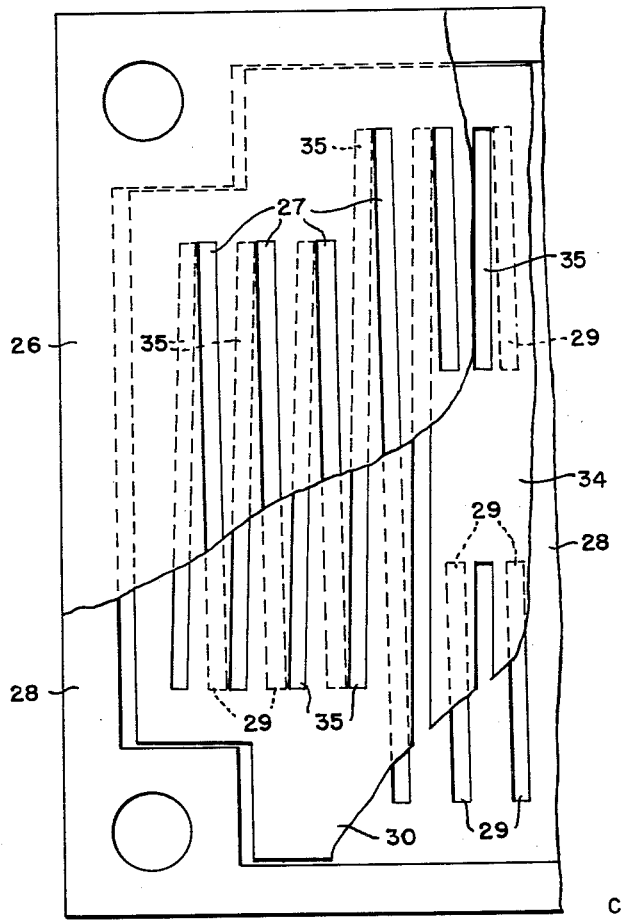
FIG. 4 is a sectional view taken on line 4—4 of FIG. 3.
Figure 4:
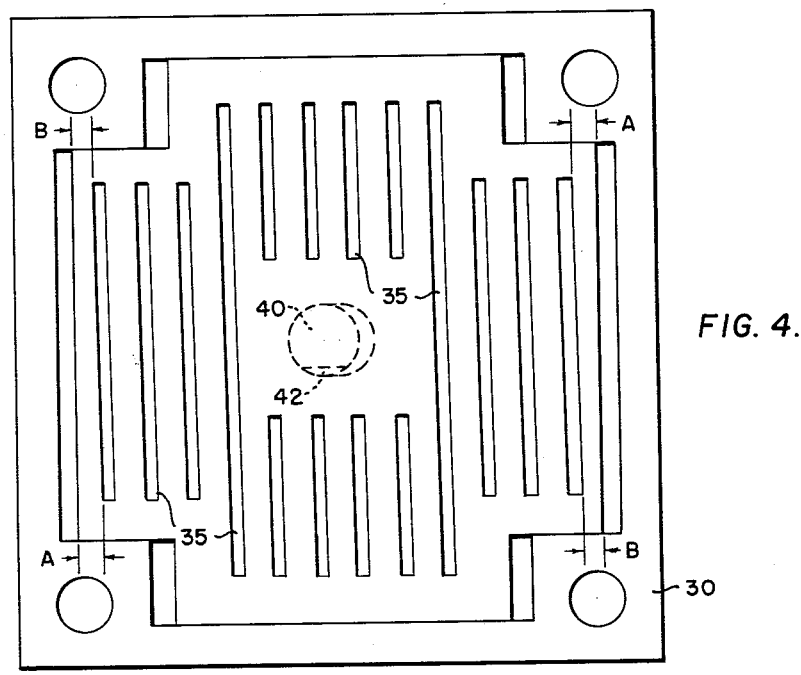
Figure 5:
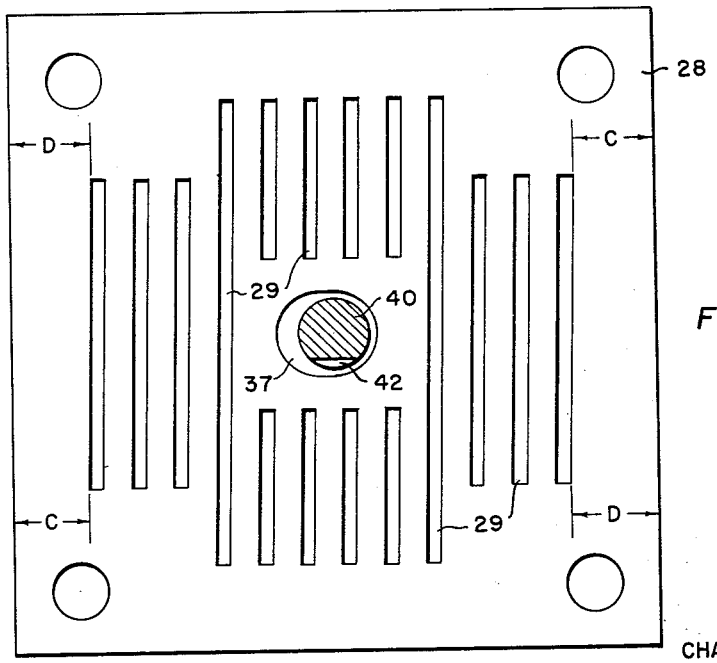
Figure 6:
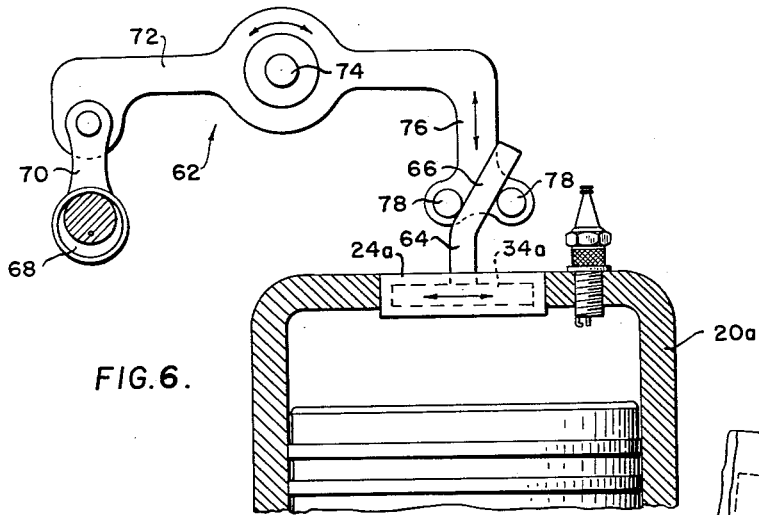
Figure 9A:
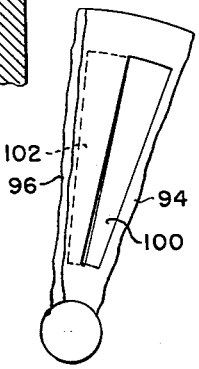
Figures 7, 10:
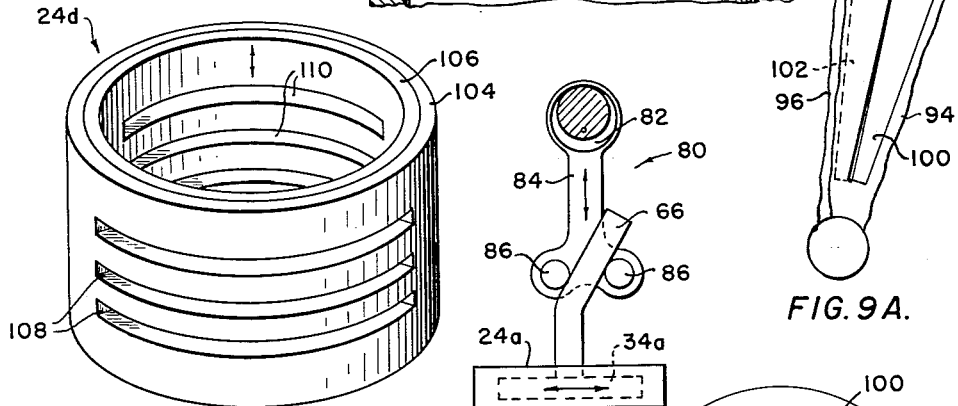
Figures 8, 9:
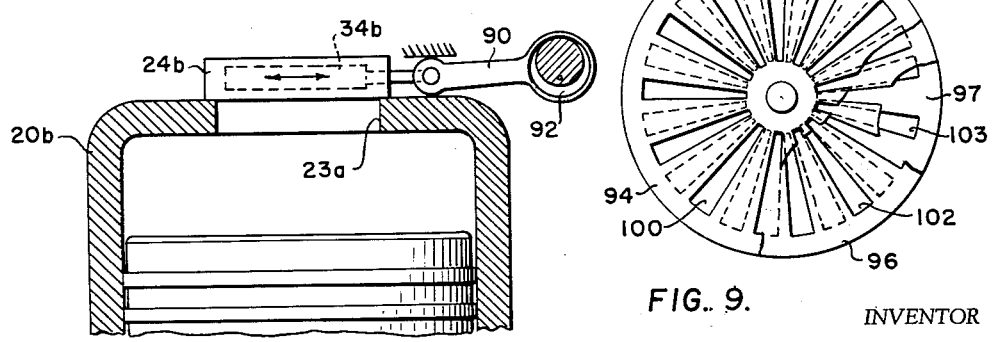

FIG. 4-A is an enlarged plan view, partially broken away, of the structure shown in FIG. 3, showing detailed features of said structure;

FIG. 5 is a sectional view taken on line 5—5 of FIG. 3;

FIG. 6 is an elevational sectional view, partially broken away, of a further embodiment of an actuating means adapted to be utilized in conjunction with the instant invention;

FIG. 7 is a sectional view of the instant valve invention showing still a further embodiment of a valve actuating mechanism therefor;

FIG. 8 is an elevational, sectional view, partially broken away, of still another embodiment of a valve actuating mechanism adapted to be utilized with the instant valve;

FIG. 9 is a plan view of a rotary embodiment of the instant valve invention;

FIG. 9A is an enlarged view of a portion of the structure shown in FIG. 9;

FIG. 10 is perspective view of a cylindrical embodiment of the instant valve invention;

FIG. 11 is a perspective view partially broken away, of the instant valve as used in a pipeline;

FIG. 12 is a transverse sectional view of the structure shown in FIG. 11; and

FIG. 13 is a transverse sectional view of a portion of the structure shown in FIG. 12, showing the valve in open position.

Figure 1:
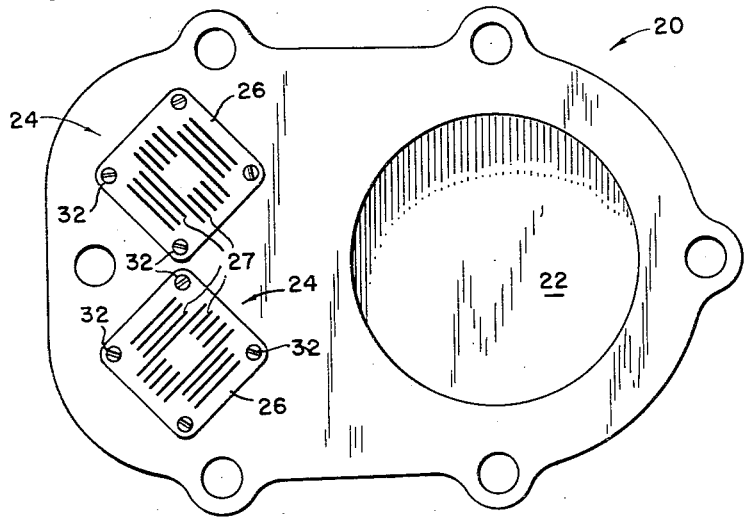
FIG. 1 is a plan view of an internal combustion engine, with the head thereof removed, as modified in accordance with the instant invention.

Referring now to the drawings wherein like reference characters designate like or corresponding parts throughout the several views, there is shown in FIG. 1 an internal combustion engine 20 modified in accordance with the instant invention. The engine 20 is provided with a conventional piston 22 and a pair of valve ports 23 one being an inlet port and the other an exhaust port, each of which is provided with a valve 24 constructed in accordance with the instant invention.

Figure 2:
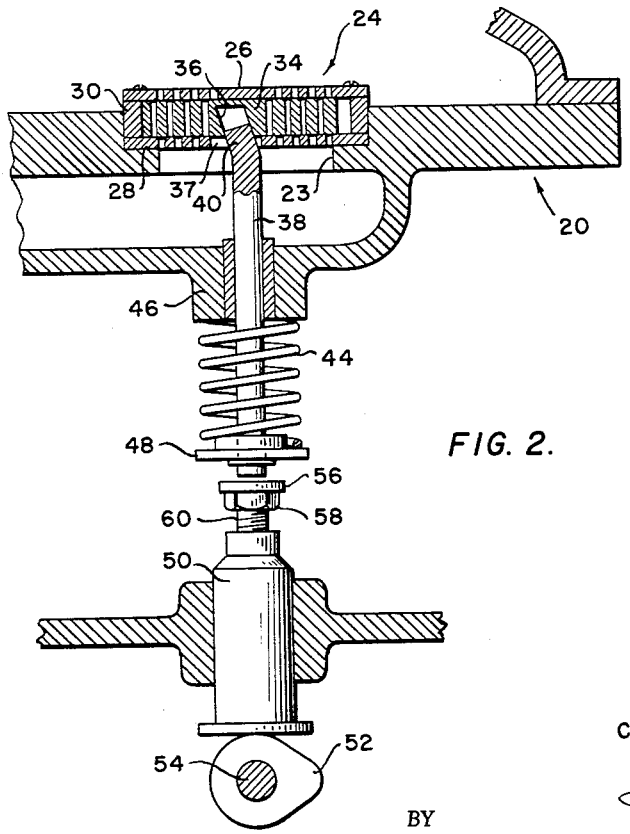
FIG. 2 is an elevation, sectional view, partially broken away, of the instant valve invention showing one embodiment of the means utilized to operate the same.

The valve 24 comprises an upper plate 26 and a lower plate 28, which plates are spaced from one another and parallel to one another. The plates 26 and 28 are held in spaced parallel relation with one another by a spacer ring 30 to which the plates 26 and 28 are fixedly connected by number of screws 32. It is emphasized that the valve 24 is properly seated over the valve port 23 by either a frictional fit in recessed opening, as shown in FIG. 2, or by extending the screws 32 beyond the lower plate 28 and into the engine block 20.

There is interposed between the plates 26 and 28 a valve closure or slide plate 34 which has a thickness substantially equal to the space between the innermost surfaces of the plates 26 and 28 so as to provide a sliding, yet air-tight fit between the respective surfaces of the closure plate 34 and the innermost surfaces of the plates 26 and 28. In this connection, it is emphasized that the space shown between the closure plate 34 and the plates 26 and 28 is greatly exaggerated in FIG. 3 due to the greatly enlarged nature of said figure and that in reality said plates are in surface contact.

For purposes hereinafter described the slide plate 34 is provided with a centrally located hole 36 extending partially therethrough and at an angle to the upper and lower surfaces of the plate. In addition, the plate 28 is provided with a central, elongated hole 37.

In accordance with one embodiment of this invention, the slide plate 34 is actuated by a reciprocatory rod 38 slidably mounted in the engine block 20. The upper end of the rod 38, as viewed in FIG. 2, is provided with an axially offset portion or cam member 40 that is of substantially the same diameter as the hole 36 in the slide plate 34 and the axis of which is inclined from the vertical the same number of degrees as said hole 36. In addition, the offset portion 40 is provided on one side thereof with a flat surface 42 adapted to allow lubricant or the like to flow out of the hole 36 from above the upper end of the offset portion.

The rod 38 is normally held in a downward position by the action of a coil spring 44 that encircles said rod and which is compressed by having its opposite ends between a bearing boss 46 on the engine block 20 and a disk 48 fixed on the end of the rod. In accordance with the embodiment of the invention shown in FIG. 2, the rod is actuated by a cam follower 50 which in turn is driven in a vertical direction by a rotary cam 52 attached to a cam shaft 54. The upper end of the cam follower 50 is provided with a head consisting of a head plate 56, a nut 58 and an adjustable, threaded shank 60 which may also receive a lock nut, for clearance or lash adjustment between the lead plate 56 and the lower end of the rod 38.

For purposes of allowing gas flow through the valve 24, the upper plate 26 is provided with a plurality of elongated slots 27 which are, when the valve 24 is in assembled condition, in alignment with a like number of slots 29 in the lower plate 28. The slots 27 and 29 being equal in size, spacing relation to one another and number, and being in juxtaposed relation with one another, as shown more clearly in FIG. 3. The slide plate 34 is provided with a plurality of slots 35 equal in size, number and spacing relation to the slots 27 and 29.

An important feature of the invention, as shown in FIG. 4, 4-A and 5, is that slots 35 in slide plate 34 are not in complete juxtaposed relation with the slots 27 and 29 respectively, but rather extend slightly askew of the slots 27 and 29 so that as the plate 34 oscillates back and forth there is a scissors-like action, so to speak, between the slots 35 and the spacers between the slots 27 and 29 respectively. It is pointed out that if the spacers between the slots 35 and those between the slots 27 and 29 were absolutely parallel and completely juxtaposed in the position shown in FIG. 3, there would tend to be a binding action between the respective spacers due perhaps to bending or other flexure of the valve 24. However, by virtue of the skew arrangement described above, the resultant scissors-like action prevents binding between the slide plate 34 and the upper and lower plates 26 and 28. It has been established that this feature of the instant invention, while apparently of very small nature, nevertheless greatly improves the efficiency of operation and materially prevents mechanical failures of the instant valve. By way of example, certain dimensions are shown in FIGS. 4 and 5 to indicate the extent of the offset between the slots 35 on the one hand and 27 and 29 on the other hand. More specifically, in one embodiment of the invention, the dimension $A=.042$ inch, while dimension $D=.038$ inch, thus the slots 35 are not parallel to the respective side edges of the plate 34, as viewed in FIG. 4. On the other hand, the dimensions C and D which are the same for the plates 26 and 28 are as follows with dimension $C=.158$ inch and dimension $D=.162$ inch, thereby rendering the slots 27 and 29 non-parallel to the side edges of the respective plates. Thus when the plates 26 and 28 are assembled with the slide plate 34 the slots 27 and 29 extend slightly across the slots 35 thereby providing the aforementioned scissors-like action as the slide plate 34 oscillates between the plates 26 and 28.

Also by way of example, it is pointed out that in the embodiment shown in FIGS. 1–5, the slots 27, 29 and 35 are each .020 inch in width, while the overall dimension of the valve 24 is one inch along each of its sides. It is emphasized that the various aforementioned dimensions are given by way of example only, and that various other dimensions and/or combinations thereof are possible in carrying out the instant invention. However, it is reemphasized that through various dimensions of the valve itself and the slots therein may be used, the slots 27 and 29 in the plates 26 and 28 should, for the greatest efficiency of operation, extend askew of the slots 35 in the slide plate 34 so as to bring about the aforementioned scissors-like action.

It is emphasized that the askew relation between the slots, as described above, results in materially improved efficiency of operation by preventing binding between the relatively slidable valve plates.

Referring now to FIG. 6, wherein is shown a modified embodiment of the instant invention, there is shown a modified valve 24a and a modified valve actuating mechanism 62. The modified valve 24a is fixedly mounted in a suitable provided opening in an engine block 20a by any means desired. It is emphasized that the valve 24a is, like the valve 24, composed of upper and lower perforated plates having therebetween a slide plate 34a which as actuated serves to intermittently open and close the valve 24a in a manner hereinafter described. The slide plate 34a has either fixedly or removably attached thereto a follower rod 64 having a portion thereof extending at right angles to the slide plate 34a, and an offset upper end portion 66 angularly bent relative to the portion attached to the slide plate.

The actuating mechanism 62 comprises a rotary eccentric 68 having a pitman 70 drivably attached thereto in a conventional manner, the upper end of the pitman in turn being pivotally attached to a rocker arm 72 that is pivotly mounted intermediate its ends on a shaft 74. The right hand end of the rocker arm 72 is provided with a downwardly extending arm 76 having at its lowermost end a pair of spaced rollers 78 which are so dimensioned and spaced as to be astride the offset arm 66 on the rod 64 so that as the right hand end 76 of the rocker arm 72 rises due to the action of the eccentric 68, the rollers 78 have a camming action on the arm 66 to cause side to side movement thereof, and thereby side-to-side movement, or oscillating motion, of the slide plate 34a so as to cause alternate opening and closing of the valve 24a.

Referring to FIG. 7, wherein is shown another embodiment of the valve, there is shown an actuating means 80 for the valve 24a shown in FIG. 6. The instant actuating mechanism 80 comprises an eccentric 82 drivably connected to a pitman 84 having at one end thereof a pair of spaced rollers 86 astride the offset arm 66, which in turn is connected to the slide plate 34a within the valve 24a. Thus, rotary motion of the eccentric 82 causes side-to-side oscillatory motion of the extension 66 and the slide plate 34a.

Attention is directed to FIG. 8 wherein is shown still another embodiment of the instant invention. In accordance with the embodiment shown in FIG. 8, a further modified valve 24b is fixedly attached to an engine block 20b over an opening 23a provided in said engine block. In general the construction of the valve 24b, insofar as the upper and lower plates and the slide plate therebetween is concerned, is similar to the above described valve 24. However, the valve 24b is provided with a slightly modified slide plate 34b having attached to one side thereof a rod 88 to which is pivotly attached one end of a pitman 90 that is drivably engaged with an eccentric 92. Rotation of the eccentric 92 causes oscillatory movement of the pitman 90 which in turn oscillates the rod 88 and the slide plate 34b to alternately open and close the valve 24b.

In accordance with the embodiment of the invention shown in FIG. 9, a substantially modified valve 24c is provided. The valve 24c is substantially circular in shape and comprises three relatively rotatable disks 94, 96 and 97 pivotly connected to one another by a pin 98. The disk 94 is provided with a plurality of radially extending wedge-shaped slots 100, likewise the disk 96 is provided with a plurality of radially extending slots 102 and the disk 97 is provided with like slots 103. The slots 100, 102 and 103 are of substantially the same size and shape, and are adapted to be brought to juxtaposed relation with one another so as to allow fluids to flow through the valve 24c. It is emphasized that the axes of the slots 102 do not extend through the same center as the axes of the slots 100 and 103, thereby placing said slots 102 askew of the slots 100 and 103 so as to cause a scissors-like action between the edges of the slots in the respective disks as they are rotated relative to one another.

In accordance with the embodiment shown in FIG. 9, the respective disks may be rotated in various manners relative to one another so as to bring the slots 100, 102, and 103 into alignment so as to allow fluids to flow through the valve. In order to vary the timing of the valve 24c it is contemplated that one of the disks 94, 96 or 97 have the motion and/or slot spacing therein so regulated that it is possible for the slots in the disks to skip one or more of the adjacent slots in the other disks thereby varying the interval of time between the various open stages of the valve 24c. This permits additional flexibility in the terms of valve timing. It is emphasized that the instant embodiment may be modified to utilize only the top two disks 94 and 96.

Alternately, the valve shown in FIG. 9, may be operated as an oscillatory valve, that is with one or more of the disks oscillating back and forth relative to other disks instead of continuously rotating in the same direction.

It is pointed out that while the embodiment shown in FIG. 9 is flat, the cooperating members may take the form of concentric cones, hemispheres or the like.

Referring to the embodiment shown in FIG. 10, there is shown a cylindrical valve 24d. The valve 24d comprises an outer sleeve 104 and an inner sleeve 106, the outside dimensions of the inner sleeve 106 being substantially equal to the inside dimension of the outer cylinder 104 so as to provide a tight, sliding concentric fit therebetween. The sleeves 104 and 106 are adapted to oscillate up and down relative to one another so as to intermittently admit gases through the valve. The sleeve 104 is provided with a plurality of spaced slots 108, and the innermost sleeve 106 is provided with a plurality of spaced slots 110. It is emphasized that the slots 108 and 110 extend askew of one another so as to prevent binding between the sleeves 104 and 106 by utilizing the scissors-like action between the spacers between the slots 108 on the one hand, and the slots 110 on the other hand. It is emphasized that any type of driving mechanism may be used to move the cylinders 104 and 106 relative to one another so as to intermittently bring the slots 108 and 110 into alignment with one another so as to admit gases from the exterior of the valve 24d into the interior thereof and thence into an engine.

Referring to FIGS. 11, 12 and 13, there is shown a section of a pipeline 112 having a flow arresting valve 24e fixedly mounted therein. The valve 24e comprises a pair of fixed plates 26e and 28e and a slide plate 30e. The valve 24e is also provided with a control handle on the like 114 operable from outside the pipe 112 and connected to the slide plate 30e. It is emphasized that the valve 24e may be constructed in accordance with any of the embodiments described above and shown in FIGS. 1–10. In addition, the valve 24e is of course provided with the askew-slot arrangement described above and shown in FIGS. 4, 4A and 5.

As can be seen in FIG. 13, the valve 24e, or for that matter any of the aforementioned valves, lends itself to certain modifications adapted to provide improved flow characteristics through the valve. To be more specific, the spacers between the slots in one or more of the outer plates of the valve may be provided with a streamlined cross-section, an example of which is shown in FIG. 13.

It is reemphasized that while the following description of the operation of the instant invention deals largely with an internal combustion engine, the instant valve may just as readily be utilized in any fluid flow situation, such as a pipeline, a wind tunnel, an air compressor, etc.

*Operation*

It is pointed out that the operation of the instant invention is relatively straightforward. More specifically, referring to FIGS. 1 thru 5, it is pointed out that as the cam shaft 54 rotates the cam 52 causes oscillatory motion of the follower 50 which in turn causes periodic rise and fall of the rod 38. Due to the interaction of the offset portion 40 on the rod 38 and the wall of the hole 36 in the slide plate 34, up and down motion of the rod causes the slide plate 34 to be cammed from side-to-side. The various elements are so dimensioned and timed that at predetermined intervals of time slots 27 and 29 and the slots 35 are in alignment so as to open the valve to admit combustible gases into the engine 20.

The various embodiments shown in FIGS. 6–11 all operate in much the same manner as the embodiment in FIGS. 1–5, being actuated by the various valve actuating arrangements shown and described above.

Due to the nature of the invention it is pointed out that various modifications beyond those shown in the drawings, are possible in the construction thereof. For example, it is possible that the slots or rather the spaces between the slots in the plates 26, 28 and 34 may be so shaped as to bring about a more satisfactory aerodynamic flow of gases through the valve, thereby reducing turbulence and other factors of unsatisfactory gas flow through the valve. In addition, by virtue of the intimate fit between the slide plate 34 and the plates 26 and 28, the valve is in a sense self cleaning due to the aforementioned scissors-like and shearing action between the various plate elements.

A further material advantage of the instant invention over the prior art is that there is a relatively small movement of the slide plate 34 in going from a completely closed to a completely open position; for example, if the slots are .020 inch in width and the space therebetween is .040 inch, the total amount of movement is in the nature of .035 inch, whereas with a conventional tappet valve the valve usually moves one-eighth to one-quarter of an inch. This latter feature results in a number of material advantages, one of which is that the instant valve results in a greater area of valve opening for a given amount of valve movement than is possible with a conventional tappet valve. In addition, this feature, coupled with the fact that the valve elements have lower inertia than tappet valve, being extremely light, makes possible extremely rapid movement of the slide plate 34, thus making it possible for the engine to run at a much higher rate of speed than is possible with a tappet valve. The instant valve may be constructed to have a total thickness of ¼ inch or less.

It should also be noted that the valve opening, in the case of the instant invention, is dependent upon the cross sectional area of the valve and the opening into which it is inserted, rather than to the stroke or lift as is the case with a tappet valve. In addition, the instant valve is substantially free of any tendency to jam, due to the slide action utilized, and more particularly due to the scissors-like movement described above. Lubrication action is also improved in the case of the instant invention due to the lapping action between the slide plate 34 and the plates 26 and 28.

It is emphasized that while a spring valve closing mechanism has been shown on FIGS. 1 through 5, such a spring type enclosure means is not necessary as examination of FIGS. 6, 7 and 8 will show. Thus, this invention results in a valve that is susceptible to positive drive action without the necessity for the use of springs. The absence of springs in certain embodiments of this invention eliminates the problem of resonance, thus making higher speed operation possible. With a conventional tappet valve of the type generally used, at extremely high speeds, resonant vibrations of the tappet valve mechanism are generated.

Also, due to the high intertia of the structure a tappet valve never really completely closes at high speeds, but rather tends to oscillate between open and a partially closed position. With the instant invention however, it is always possible to move the valve from a completely open to a completely closed position regardless of engine and valve speed due to the relatively small amount of valve movement.

Thus in summation, it is emphasized that the instant valve, as shown in its various embodiments, results in a valve structure of a substantially improved nature as compared to that utilized in the prior art, and a structure that is substantially more efficient, foolproof and less expensive to fabricate than the prior art valves or other fluid flow control devices.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. In combination with a valve comprising a plate member having a plurality of openings formed therein and extending therethrough, a slide plate in surface contact with one face of said plate, said slide plate having a plurality of openings formed therein and extending therethrough, the openings in said slide plate being capable of overlapping the openings in said plate member, an improved drive means associated with said slide plate for moving said slide plate to a position in which the openings in the slide plate overlap the openings in the plate member, whereby fluid may flow through said valve; said drive means including a hole formed in said slide plate and extending partially therethrough, said hole having the axis thereof extending at an angel to a surface of said slide plate, a reciprocatory rod having one end thereof bent at an angle relative to the remainder of the rod to form an offset portion, said offset portion being slidably mounted within the hole in the slide plate, the axis of said offset portion extending at the same angle to the surface of said slide plate as the axis of said hole, whereby reciprocatory movement of said rod causes the offset portion on said rod to cam said slide plate from side-to-side.

2. In combination with a valve comprising a first plate having a plurality of openings formed therein and extending therethrough, a second plate spaced from said first plate and extending parallel thereto, said second plate having a plurality of openings formed therein and extending therethrough, the openings in said second plate being substantially in alignment with the openings in said first plate; a slide plate interposed between said first and second plates, a plurality of openings formed in said slide plate and extending therethrough, the openings in said slide plate being capable of overlapping the openings in said first and second plates; an improved drive means for causing relative movement between said first and second plates and said slide plate to selectively bring the openings in said first and second plates and said slide plate selectively into overlapping relation, said drive means including a hole formed in said slide plate and extending partially therethrough, said hole having the axis thereof extending at an angle to a surface of said slide plate, a rod having one end thereof bent at an angle relative to the remainder of the rod to form an offset portion, said rod slidably extending through one of said first and second plates and the offset portion thereof being slidably mounted within the hole in the slide plate, the axis of said offset portion extending at the same angle to the surface of said slide plate as the axis of said hole, and means for reciprocating said rod, said reciprocatory movement of said rod causing the offset portion on said rod to cam said slide plate from side-to-side.

3. In combination with a valve comprising a plate member having a plurality of openings formed therein and extending therethrough, a slide plate in surface contact with one face of said plate member, said slide plate having a plurality of openings formed therein and extending therethrough, the openings in said slide plate being capable of overlapping the openings in said plate member, an improved drive means associated with said slide plate for moving said slide plate to a position in which the openings in the plate member and said slide plate overlap one another, whereby fluid may flow through said valve, the improved drive means including a hole formed in said slide plate and extending partially therethrough, said hole having the axis thereof extending at an angle to a surface of said slide plate, a rod having one end thereof bent at an angle relative to the remainder of the rod to form an offset portion, said offset portion being slidable mounted within the hole in the slide plate the axis of said offset portion extending at the same angle to the surface of said slide plate as the axis of said hole and means for reciprocating said rod, said reciprocatory movement of said rod causing the offset portion on said rod to cam said slide plate from side-to-side to selectively bring the slots in said plate member and said slide plate into overlapping relation, whereby fluid may pass through the valve.

4. In the combination of a valve comprising a plate member having a plurality of openings formed therein and extending therethrough, a slide plate in surface contact with one face of said plate member, said slide plate having a plurality of openings formed therein and extending therethrough, the openings in said slide plate being capable of overlapping the openings in said plate member, and an improved drive means associated with said slide plate for moving said slide plate to a position in which the openings in the first plate and said slide plate, respectivley overlap one another, whereby fluid may flow through said valve; said drive means comprising, a rod attached to said slide plate, said rod comprising a substantially straight portion and a portion bent relative to said straight portion to form an angularly off-set portion, a reciprocatory member, said reciprocatory member having means therein astride said angularly off-set portion of said rod and in contact with the opposite sides thereof, and means for reciprocating said reciprocatory member in a direction substantially parallel to the straight portion of said rod, whereby the interaction of the means on said reciprocatory member astride said angularly off-set portion, and said off-set portion, causes side-to-side oscillation of said rod and therefore said slide plate.

5. In the combination of a valve comprising a first plate having a plurality of openings formed therein and extending therethrough, a second plate spaced from said first plate and extending parallel thereto, said second plate having a plurality of openings formed therein and extending therethrough, the openings in said second plate being substantially in alignment with the openings in said first plate; a slide plate interposed between said first and second plates, a plurality of openings formed in said slide plate and extending therethrough, the openings in said slide plate being capable of overlapping the openings in said first and second plates, and an improved drive means for selectively moving said slide plate relative to said first and second plates to bring the openings in said first and second plates and said slide plate selectively into overlapping relation with one another, thereby allowing fluids to flow through the valve; said drive means comprising, a rod attached to said slide plate and extending at substantially right angles thereto, said rod having an angularly offset end portion, a reciprocatory member, said reciprocatory member having means at one end thereof astride the angularly offset portion of said rod and in surface contact with opposite sides thereof, whereby movement of said reciprocatory member relative to said rod causes side-to-side oscillation of said rod and therefore said slide plate.

6. A valve comprising a first sleeve member and a second sleeve member, each of said sleeve members having a plurality of openings formed therein and extending therethrough, said sleeve members being concentric to one another and in slidable, surface contact with one another, the openings in one sleeve being capable of overlapping the openings in the other sleeve, whereby fluids may pass from the exterior of the outer sleeve to the interior of inner sleeve, drive means for reciprocating one of said sleeves relative to the other to selectively bring said openings into overlapping relation with one another, and the edges of the openings in one of said sleeves extending at an angle to the edges of the adjacent openings in the other sleeve, whereby relative reciprocatory movement between said sleeves causes a scissors-like action between the edges of the adjacent, overlapping openings in the respective sleeves, thereby preventing binding between said edges during relative reciprocatory motion of the sleeves.

7. In a combination of a valve comprising a plate member having a plurality of openings formed therein and extending therethrough, a slide plate in surface contact with one face of said plate, said slide plate having a plurality of openings formed therein and extending therethrough, the openings in said slide plate being capable of overlapping the openings in said plate member, an improved drive means comprising, a pitman, a rotatable eccentric, one end of said pitman being drivably connected with said eccentric, and the opposite end of said pitman being connected to a side edge of said slide plate whereby rotation of said eccentric causes reciprocation of said slide plate.

8. In an internal combustion engine having gas inlet and exhause ports, and a valve in each of said ports; the improvement residing in that at least one of said valves comprises a plurality of superposed relatively slidable members in surface contact with one another, each of said members having a plurality of spaced slots formed therein and extending therethrough, the slots in one member being capable of overlapping the slots in the other member; and the side edges of the slots in one of said members extending at an angle to the side edges of the slots in an adjacent member, whereby there is a scissors-like action between the slot spacers in one member and the slot spacers in an adjacent member.

9. In an internal combustion engine having gas inlet and exhaust ports; a valve in each of said ports; at least one of said valves comprising a first plate having a plurality of elongated slots formed therein and extending therethrough, a second plate spaced from said first plate and extending parallel thereto, said second plate having a plurality of slots formed therein and extending therethrough, the slots in said first and second plates being substantially equal in number, size and spatial relation to one another, and being substantially in alignment with one another; a slide plate interposed between said first and second plates, a plurality of slots formed in said slide plate and extending therethrough, the slots in said slide plate being substantially equal in number, size and shape to the slots in said first and second plates and being capable of overlapping the slots in said first and second plates and the slots in said first and second plates on the one hand, and said slide plate on the other hand extending at an angle to one another, whereby there is a scissors-like action between the slot spacers on said first and second plates and the slot spacers on said slide plate.

10. In an internal combustion engine having gas inlet and exhaust ports, a valve in each of said ports, at least one of said valves comprising a plate member having a plurality of openings formed therein and extending therethrough, a slide plate in surface contact with one face of said plate member, said slide plate having a plurality of openings formed therein and extending therethrough, the openings in said slide plate being capable of overlapping the openings in said plate member, and an improved drive means associated with said slide plate to move said slide plate to a position in which the openings in the plate member and said slide plate overlap one another, whereby fluid may flow through said valve, said drive means including a hole formed in said slide plate and extending partially therethrough, said hole having the axis thereof extending at an angle to a surface of said slide plate, a rod having one end thereof bent at an angle relative to the remainder of the rod to form an offset portion, said offset portion being slidably mounted within the hole in the slide plate the axis of said offset portion extending at the same angle to the surface of said slide plate as the axis of said hole and means for reciprocating said rod, said reciprocatory movement of said rod causing the offset portion on said rod to cam said slide plate from side-to-side to selectively bring the slots in said plate member and said slide plate into overlapping relation, whereby fluid may pass through the valve.

11. A valve comprising, a plurality of superposed relatively slidable members in surface contact with one another, each of said members having a plurality of spaced elongated slots formed therein and extending therethrough, said members being selectively slidable relative to one another to a position at which at least a portion of said slots in said respective members are in alignment, and in which they are out of alignment; the slots in one of said members extending at an angle to the slots in an adjacent member, whereby there is a scissors-like action between the slot spacers in one member and the slot spacers in another member thus preventing binding between the relatively slidable members during relative sliding movement therebetween.

12. A valve comprising, a plate member having a plurality of elongated slots formed therein and extending therethrough, a slide plate in surface contact with one face of said plate member, said slide plate having a plurality of elongated slots formed therein and extending therethrough, the slots in said slide plate being capable of overlapping the slots in said plate member, the slots in said plate member and said slide plate being substantially equal in number, spacing and size, the slots in one of said plates extending at an angle to the slots in the other plate, whereby relative movement between said plate member and said slide plate causes a scissors-like action between the portions of the plates between adjoining slots on the plate member and on the slide plate respectively, thereby preventing binding between the plate member and the slide plate during relative movement therebetween.

13. A valve comprising, a first plate member having a plurality of slots formed therein and extending therethrough, a second plate member spaced from the first plate member and extending parallel thereto, said second plate member having a plurality of slots formed therein and extending therethrough, the slots in said second plate member being substantially in alignment with the slots in said first plate member; a third plate member interposed between said first and second plate members and in surface contact with at least one of said first and second plate members, said third plate member having a plurality of slots formed therein and extending therethrough, the slots in said third plate member being substantially equal in number, size and shape to the slots in said first and second plate members, whereby fluids may be selectively allowed to pass through said valve, the slots in said first and second plate members extending parallel to one another and the slots in said third plate member extending at an angle to the slots in said first and second plate members, whereby there is a scissors-like action between the edges of the slots in the first and second plate members, and the edges of the slots in the third plate member, upon relative movement between said plate members.

14. A valve comprising a plurality of superposed relatively slidable members in surface contact with one another, said members being rotatable relative to one another about a common axis, each of said members having a plurality of radially extending, substantially wedge-like slots formed therein and extending therethrough; the longitudinal axis of each of the slots in one member extending through said axis of rotation of both members and the respective longitudinal axes of the slots in the other member extending radially from a center that is offset from said axis of rotation, thereby causing a scissors-like action between the edges of the slots in the respective members during rotation of said members relative to one another.

15. A valve comprising, a plurality of superposed relatively slidable members in surface contact with one another, each of said members having a plurality of spaced elongated slots formed therein and extending therethrough, said members being selectively slidable relative to one another to a position in which at least a portion of the slots in said members are in alignment, and in which they are out of alignment; the edges of the slots in one of said members extending at an angle to the edges of the slots in an adjacent member, whereby there is a scissors-like action between the edges of a slot in one member and the edges of an immediately adjacent slot in another member thus preventing binding between the portions of the respective members between successive slots, during relative sliding movement between said members.

16. In a combination of a valve comprising a plate member having a plurality of openings formed therein and extending therethrough, a slide plate in surface contact with one face of said plate, said slide plate having a plurality of openings formed therein and extending therethrough, the openings in said slide plate being capable of overlapping the openings in said plate member, an improved drive means comprising, a rod attached to said slide plate in driving engagement therewith, a cam follower on said rod, a reciprocatory member having a cam means thereon in driving engagement with the cam follower on said rod, said cam and cam follower being so proportioned relative to one another that upon reciprocation of said reciprocatory member, said rod and therefore said slide plate are caused to oscillate relative to one another.

References Cited in the file of this patent

UNITED STATES PATENTS

| | | |
|---|---|---|
| 490,146 | James | Jan. 17, 1893 |
| 1,567,537 | Mockus | Dec. 29, 1925 |
| 1,722,873 | Welch | July 30, 1929 |
| 1,922,678 | Hallett | Aug. 15, 1933 |
| 2,573,301 | Berlyn | Oct. 30, 1951 |
| 2,641,871 | Ray | June 16, 1953 |
| 2,772,695 | Harrison | Dec. 4, 1956 |